United States Patent [19]
Brown

[11] Patent Number: 5,805,172
[45] Date of Patent: Sep. 8, 1998

[54] METHOD OF GENERATING ABSTRACT DESIGNS

[76] Inventor: Ray Brown, 4650 N. Washington Blvd. #606, Arlington, Va. 22201

[21] Appl. No.: 845,280

[22] Filed: Apr. 21, 1997

Related U.S. Application Data

[63] Continuation of Ser. No. 555,893, Nov. 13, 1995, abandoned.
[51] Int. Cl.$^6$ ................................................. G06F 15/00
[52] U.S. Cl. ................................................. 345/442
[58] Field of Search ........................... 395/140, 141, 395/142, 143; 345/440, 441, 442, 443, 470

[56] References Cited

U.S. PATENT DOCUMENTS

| 5,410,645 | 4/1995 | Ooka et al. | 395/142 |
| 5,467,443 | 11/1995 | Johnson et al. | 395/141 |

OTHER PUBLICATIONS

Gasson, "Geometry of Spatial Forms", pp. 498–505, 1983.
Seillac, "Seillac – 7", IEEE Computer Graphics and Applications pp. 1 and 2, Brochure, Feb. 1984.

Primary Examiner—Phu K. Nguyen

[57] ABSTRACT

A method of using a computer with graphics capability to generate abstract graphical designs. The computer is programmed with mathematical formulas for at least two families of nonintersecting curves and a base curve which intersects these other curves. A programmed point is chosen on the base curve in accordance with a programmed base rule, and is moved along the other curves in accordance with programmed design rules. The postion of the point after moving in accordance with the design rules is plotted. Successive points are chosen on the base curve in accordance with the base rule, and their postitions are plotted after moving in accordance with the design rules. The totality of the plotted points is the design.

13 Claims, 4 Drawing Sheets

METHOD OF GENERATING ABSTRACT DESIGNS

This application is a continuation of application Ser. No. 08/555,893, filed Nov. 13, 1995, now abandoned.

BACKGROUND OF THE INVENTION

This invention is in the field of graphical designs, particularly those known as abstract designs. Dating from such as cave markings by early humans, abstract design is an ancient art. Since its beginning, the means of creating abstract designs has changed little; it is primarily a human enterprise, with some degree of "automation" arising from the use of stencils and other implements to make the designs. Of late, computers have been used to generate abstract designs using simple mathematical formulas. Unfortunately, these stencils and implements, and simple formulas on computers, yield rather simple designs. In order to generate more complex and more interesting designs, computer operators have resorted to the use of such things as random number generators in conjunction with classical geometric forms to interject complexity and spontaneity into their designs. The area that has received the greatest attention is the computer screen saver market. In spite of the interest resulting from market pressure, little advance has been made in originality. Almost all screen savers use an abstract varying pattern which depends upon random number generators combined with simple geometric forms such as straight lines, circles, triangles, etc. for their source material. Moreover, all screen savers with abstract designs rely on techniques using specific mathematical formulas or circuits rather than generic guidlines. None of these techniques rival the complexity of the human creative process. Only one design technique any way approaches such complexity, and that is the construction of fractals. The study of fractals as representatives of chaotic systems is a recent phenomenon. Fractals may be constructed from formulas using specific and mathematically prescribed processes. Such processes are taught by H.-O. Peitgen and P. H. Richter in their 1986 book entitled: "The Beauty of Fractals: Images of Complex Dynamical Systems", published by Springer-Verlag, and by Hans Lauwerier in his book entitled: "Fractals: Endlessly Repeated Geometrical Figures", which was published in 1991 by the Princeton University Press. Also, Tim Wegner et al, in their 1992 book "Fractals for Windows, by the Waite Group Press, show various computer programs for generating fractals. These references not only show examples of chaotic figures (fractals, in particular), but also teach how to make specific figures using a personal computer with good graphics capability. Although the techniques known in the art are capable of producing many beautiful designs, they are limited both in the types of images possible, and the time necessary to generate them. My invention, by using an entirely new method, is able to produce an extensive repertoire of image types and numbers, by a very simple process, and at very high speed.

SUMMARY OF THE INVENTION

This invention is a method for making abstract geometrical figures. The figures are make by moving a generating point along at least two distinct families of nonintersecting design curves and plotting the position of the point after it has so moved. More particularly, for two families, the point is moved to successive generating points along a base curve, and for each such position, is moved along a member of one of the families of curves in accordance with a first rule, then along a member of the other family of curves in accordance with a second rule. Its position is plotted after the moves, and this plotted position is one of the points of the abstract design. From this plotted position, the movements as dictated by the rules are repeated for a number of times and a new point is plotted for each sequence of moves. For each generating point on the base curve, the repeated moves (in accordance with the rules) along the members of the families of curves are in turn repeated, in accordance with the desired complexity of the abstract design. For a design with color, one changes the color of the plotted points for each generating point on the base curve. For additional complexity of the abstract designs, more than two families of design curves may be used, with the generating point being successively moved on members of each family before its position is plotted.

DETAILED DESCRIPTION OF THE INVENTION

My invention is a process for easily and quickly producing abstract designs. In order to generate such abstract designs on a desired area, I choose a number $n \geq 2$ design curve families. The families are chosen for how easily one may formulate a large number of design rules; each family completely covers the design area and consists of nonintersecting curves. The preferred curves are: circles/ellipses, straight lines, and hyperbolas. What I do is to move a generating point in turn along curves of the families from design generating points on a base curve. It should be noted that every point on the base curve falls on one (and only one) curve of each family of curves. I iterate these movements for a number $m \geq 2$ times, with m dependent on the desired complexity of the design. Preferred base curves are straight lines of any orientation or placement on the design area. In accordance with a base rule, I designate a number $p \geq 2$ design points on the base curve. By adjusting n, m, and p, I am able to generate a great number of abstract designs. Also, I am able, by my choices of specific design families and base rule, to generate designs which are discrete closed curves, or continuous curves which extend over (and sometimes beyond) the design area. For example, if I choose n=2, m=1000, and p=2, I expect to get, as an abstract design, a family of nonintersecting closed curves. For n=2, m=15, and p=1000, and selected base curves, a continuous curve, nonintersecting with itself will result.

The abstract designs thus far described will be line drawings, monocromatic in nature. I can easily add color to the designs by designating a different color for each generating point.

Figure 1:
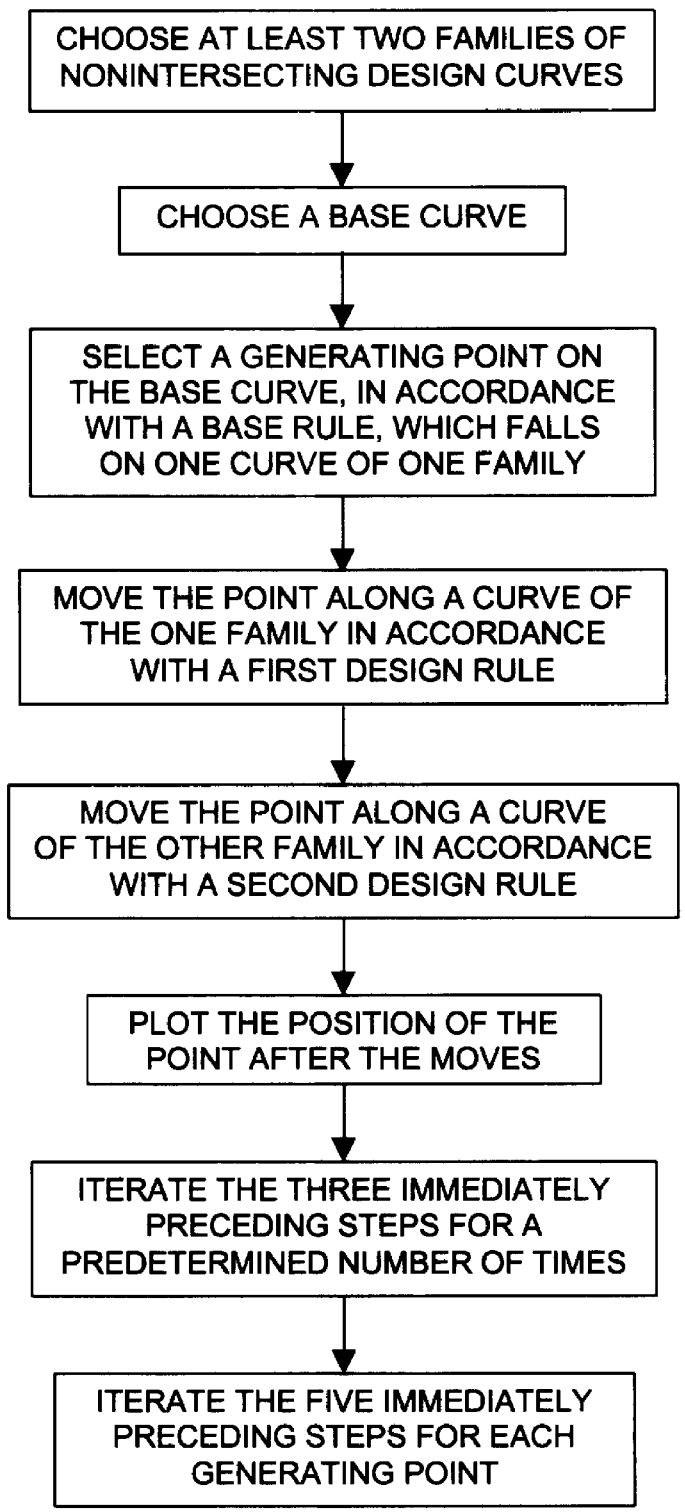
FIG. 1 shows a flow chart for the method of the invention.

Referring now to the drawings, the flow chart of FIG. 1 is illustrative of my process. I begin by choosing at least two (n) families of design curves, then choose a base curve, as described above. Then, in accordance with a base rule, I select a generating point on the base curve and successively move it along a curve of each of the families of curves. I plot the position of the point after these moves, and iterate the movements (beginning from the position of the point as reached by the previous movements) of the point for a predetermined number (m) of times. After these iterations, I return to the third step of FIG. 1 and iterate the successive steps for each generating point (p times).

Figure 2:
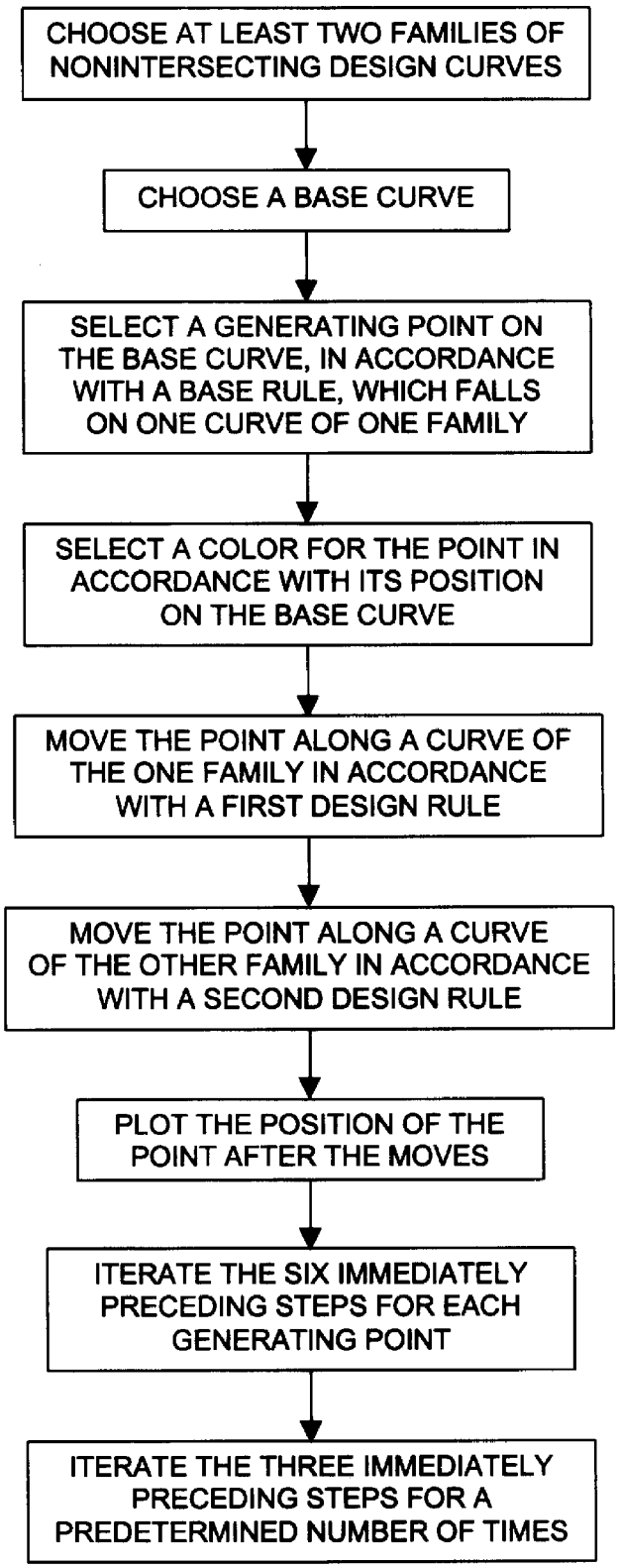
FIG. 2 shows a flow chart for the method of the invention with an additional step added to provide color.

FIG. 2 is similar to FIG. 1 except that after selecting a generating point in the third step, I choose a color for the point (when it is plotted) in accordance with its position on the base curve.

As a specific example of my method, I choose two families of concentric circles with different origins as my design curves. For a base curve from which generating points are taken, I choose a straight line which approximately bisects the design area and is almost parallel to one edge of it. Usually I choose a number of equally spaced points along the design curve as my design generating points and generate portions of the overall design by successively operating from each of the points. The movement of the generating points may be as simple or as complex as one desires. A specific operation which I use is to move the point along one of the circles by an angle equal to r radians, (wherein r is the radius of the particular circle). This is the first design rule for the movement of the point. Obviously, the point will also be on a circle the other family of circles. I then move the point 180° around the circle of the other family of circles (second design rule) and plot the position of the point. This is the first point of the overall design. This plotted point lies on one of the circles of the one family of circles. The point is then moved along this circle by an angle equal to r radians, wherein r is the radius of this particular circle of the one family (another use of the first design rule). It should be understood that each r is usually different from any other r when the first rule is applied. Applying the second rule, with the realization that the point is on a circle of the other family of curves, I move the point along this circle 180° and plot its position. The second point of the design is thus reached and plotted. One may continue to move the point as many times as one desires, nominally about 20 times. I call this combination of design rules of movement "twist and flip". I then go on to the next generating point on the base curve and do another twist and flip sequence to generate another portion of the overall design. This particular method gives an apparently continuous curve, a portion of which appears on the design area. Although the method sounds rather tedious, it is easy to do, with a very simple program, on a computer with good graphics capability.

Figure 3:
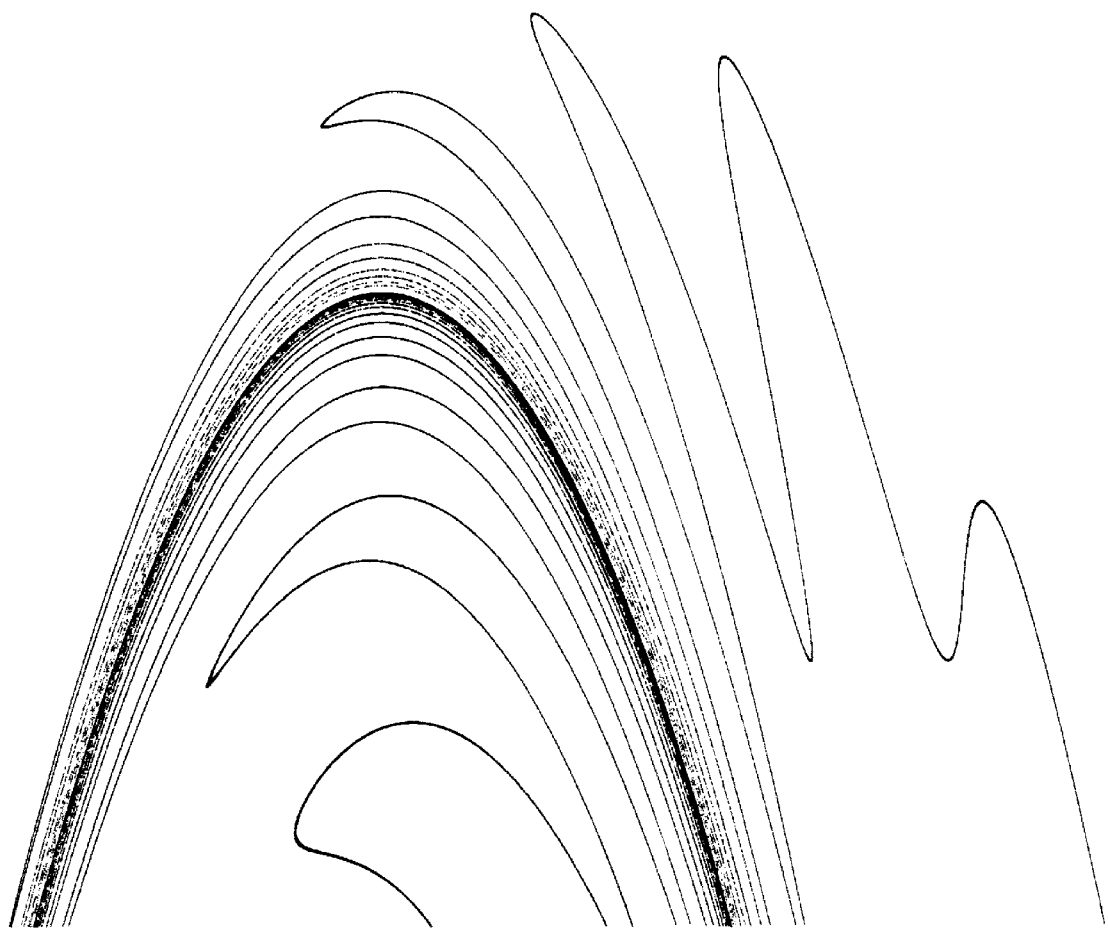
FIG. 3 is an abstract design made in accordance with the method of the invention.

The following rather simple program in Microsoft Quick-BASIC is a specific implementation of the method described above. The abstract design which it yields is shown in FIG. 3. As can be seen, this design is a portion of a complex continuous curve. For this design, n=2, m=20, and p=15, 000.

```
REM    ------------------------------------------------------------
REM    --QuickBASIC Program Illustrating Design Process using two--
REM    --families of concentric circles as design curves. First design rule:
REM    --Twist around the first family centered at (0.3, 0) by the radius;--
REM    -Rotate 180 degree (flip) around the second family centered at (0,0)
REM    ------------------------------------------------------------

REM                  ----Set Dimension Statements----
       DEFINT I–N: DEFSNG A–H, O–Z
       DIM i AS LONG REM              ----SET UP SCREEN/SCALE COORDINATES----
       yyz = 9.356: xxz = x
       xscale = 2.2: yscale = xscale / 20
       xhigh = xxz + 1.432 * xscale: x/ow = xxz − 1.432 * xscale
       yhigh = yyz + yscale: ylow = yyz − zscale SCREEN 12           '640x300 color graphics (w/ EGA only)
       WINDOW (xlow, ylow)–(xhigh, yhigh) 'define screen coordinates REM                     ----Start of Design----
REM              ----Select 15000 Design Generation Points----
REM    -On a base curve (line) passing through (0,9.356) with Slope −.089

FOR i = 1 TO 15000
           x = (−1 + (2 * (i − 1) / 15000)) * .01
           y = ((−.089) * x) + 9.356
REM    --Begin 20 Iterations of Design Generation Point by Design Rules--
       FOR j = 1 TO 20

REM       ----Apply Rule One: Twist around Cirlces Centered at (0.3, 0)---- r = SQR(((x − .3) ^ 2) + (y ^ 2))        'Compute Radius
           u = ((x − .3) * cos(r)) − (y * SIN(r)) + .3   'Rotate design
           v = (y * cos(r)) + ((x − .3) * SIN(r))        'point by radius r REM       ----Apply Rule Two:
              Rotate 180 Degrees Around Cirlces Centered at (0,0)----
           x = −u                                    'Rotate design
           y = −v                                    'point by 180 deg.
REM                        ----Plot the Resultant Point----
           PSET (x, y), 10                          'Plot the Point NEXT j
REM            ----Select the Next Point on the Base Curve----
       NEXT i
REM                    ----END OF DESIGN PROCESS----
END
```

Although I have taught that my preferred design curves are chosen from circle/ellipses, straight lines, and hyperbolas, obviously more complex families may be used. For example, they may be parabolas, etc. Moreover, the base curves need not be straight lines, but could be hyperbolas or parabolas, etc.

A specific, and rather pleasing, family of abstract designs which I have discovered are generally heart shaped. In order to make such heart-shaped designs, I choose n=3, m=1000, and p=5. As design curves, I use families of concentric circles and a family of vertical straight lines. As a base curve, I use one of these straight lines, and apply twist and flip as described above.

Figure 4:
FIG. 4 is another abstract design made in accordance with the method of the invention.

FIG. 4 is an example of my heart-shaped design. For this figure, I used the families of circles and lines as described above (so that n=3), and chose m=30,000, and p=5. If this figure were in color, I would use five colors (corresponding to p) and a background color. Besides twist and flip in this design, I also use a design rule which causes translation along a vertical line passing through the coordinate (x,0), with a magnitude $x^2$.

Generally, if I use families of circles with the first design rule based on twist, and the other design rule, regardless of the family, is a simple rotation, translation, or some other simple geometric movement, the resulting design will have bilateral symmetry. I am able to change this symmetry by using additional rules, such as translations or rotations which vary depending on the location on the area of design. For example, FIG. 4 would have bilateral symmetry if I left out the rules of translation by the square of x. Further, I am able to obtain designs that have leaf, fish, apple, and a host of basic shapes, and, and which are then filled in with abstract design features. A particularly useful process is obtained by using two twist rules around families of circles with different centers. This gives a design without bilateral symmetry. In particular, I get a circular image having another image inside with its own bilateral symmetry; the composite figure, although lacking symmetry, has an interesting complexity arising from the combined use of two twist rules.

For colors, I am able to color my designs by using any of the color technologies available on a computer. The choices range from the simple rule of choosing a different color for each design generating point (the most common rule), selecting a color using a complex algorithm, or using a pixel coloring technology available on some computers. It is also possible to generate the designs in black and white on a printer and add the colors at a later time.

In view of the above description and the drawings, I have described my invention in such detail that one skilled in the art may easily practice the invention. Moreover, minor variations in my inventive method may be obvious to such ones; the scope of the invention which I made is set forth in the following claims.

I claim:

1. A machine implemented method of generating an abstract design on a desired area, primarily comprising the steps of:
   (a) choosing a number n>1 distinct families of nonintersecting design curves, of which each family covers the area;
   (b) choosing a base curve;
   (c) selecting a design generating point in the base curve in accordance with a base rule;
   (d) successively moving the point partially along a curve of each of said n families and plotting its position as a result of such movement, this plotted position being a point of the design;
   (e) from the plotted point, repeating step (d) for $m \geq 2$ number of repetitions;
   (f) repeating steps (c), (d), and (e) for p number of repetitions, wherein $p \geq 2$.

2. The method as set forth in claim 1 wherein m>10 and p>1000.

3. A machine implemented method of generating an abstract figure on a desired area, primarily comprising the steps of:
   (a) choosing a number n>1 distinct families of nonintersecting curves, of which each family covers the area;
   (b) choosing a base curve;
   (c) selecting a design generating point on the base curve in accordance with a base rule;
   (d) moving the generating point along a curve of one of the families of curves in accordance with a first design rule;
   (e) moving the generating point from the position reached in step (d) along a curve of another family of curves in accordance with a second design rule;
   (f) plotting the position of the point after the moves;
   (g) and, from the plotted point of step (f), iterating steps (d) and (e) for m>2 number of times; and
   (h) iterating steps (c) to (f) for a predetermined number of times $p \geq 2$.

4. The method as set forth in claim 3 wherein p>1000.

5. The method as set forth in claim 3 wherein, for n>2, the generating point is successively moved along curves of each family in accordance with n respective design rules, and its position is plotted for each nth move.

6. The method as set forth in claim 3 wherein, for n>2, the generating point is successively moved along curves of each family in accordance with n respective design rules and its is position is plotted for each nth move.

7. A machine implemented method of generating an abstract design on a desired area, primarily consisting of the steps of:
   (a) choosing a number n>1 distinct families of noninterfering design curves, of which each family covers the area;
   (b) choosing a base curve;
   (c) selecting a design generating point on the base curve in accordance with a base rule;
   (d) selecting a color for the point in accordance with the base rule;
   (e) successively moving said point partially along a curve of each of said families and plotting its position as a result of such movement, this plotted position being a point of the design;
   (f) and, from the plotted postion of step (e), repeating step (e) for m>2 repetitions, wherein $p \geq 2$.

8. The method as set forth in claim 7 wherein p>1000.

9. The method as set forth in claim 7 wherein for n>2, the generating point is successively moved along curves of each family in accordance with n respective design rules and its position is plotted for each nth move.

10. A machine implemented method of generating an abstract figure on a desired area, primarily comprising the steps of:
    (a) choosing a number n>1 distinct families of noninterfering design curves, of which each family covers the desired area;
    (b) choosing a base curve;
    (c) selecting a design generating point on the base curve in accordance with a base rule;
    (d) selecting a color for the point in accordance with the base rule;
    (e) moving the generating point along a curve of one of the families of curves in accordance with a first design rule;
    (f) moving the generating point from its position in step (e) along a curve of the other family of curves in accordance with a second design rule;
    (g) plotting the position of the generating point after the moves;
    (h) and, from the plotted position of step (g), iterating steps (f) and (g) for anumber of times m>2; and
    (i) iterating steps (c) to (h) for a predetermined number of times $p \geq 2$.

11. The method as set forth in claim 10 wherein for n>2, the generating point is successively moved along curves of each family in accordance with n respective design rules and its position is plotted for each nth move.

12. A system for use in the generation of graphical designs comprising:
    generation means for generating portions of at least two distinct families of non-intersecting design curves;
    means for moving a selected point partially along a curve of each of said families of curves and plotting said selected point's position as a result of such movement whereby a chaotic graphical design is produced.

13. A system for generating graphical designs comprising:
    means for producing indicia of at least two distinct families of non-intersecting design curves;
    means for moving a selected point partially along a curve of each of said families of curves and plotting said selected point's position as a result of such movement to produce a design; and
    means for displaying the design.

* * * * *